United States Patent [19]
Greco

[11] 3,862,246
[45] Jan. 21, 1975

[54] HYDROLYSIS OF META-PHENYLENEDIAMINE
[75] Inventor: Nicholas P. Greco, Edgewood, Pa.
[73] Assignee: Koppers Company, Inc., Pittsburgh, Pa.
[22] Filed: June 29, 1972
[21] Appl. No.: 267,525

Related U.S. Application Data
[63] Continuation-in-part of Ser. No. 16,545, March 4, 1970, abandoned.

[52] U.S. Cl. ............................ 260/621 M, 423/520
[51] Int. Cl. ............................................. C07c 37/10
[58] Field of Search ................ 260/621 M; 423/520

[56] References Cited
UNITED STATES PATENTS
2,665,313   1/1954   Lisk................................ 260/621 M
3,462,497   8/1969   Greco............................. 260/621 M

*Primary Examiner*—Leon Zitver
*Assistant Examiner*—Norman P. Morgenstern
*Attorney, Agent, or Firm*—Oscar B. Brumback; Olin E. Williams

[57] ABSTRACT

Resorcinol is produced by the hydrolysis of meta-phenylenediamine in an aqueous excess of ammonium bisulfate. The reactants are contacted at an elevated temperature for a period of time sufficient to hydrolyze the meta-phenylenediamine to resorcinol. The resorcinol so produced is separated from the reaction mixture. The ammonium sulfate is regenerated to ammonium bisulfate by removing the water and thermally decomposing the by-product ammonium sulfate at an elevated temperature.

3 Claims, No Drawings

HYDROLYSIS OF META-PHENYLENEDIAMINE

CROSS REFERENCE TO RELATED APPLICATIONS

This application is a continuation-in-part of my copending application Ser. No. 16,545 filed Mar. 4, 1970, now abandoned.

BACKGROUND OF THE INVENTION

This invention relates to the production of resorcinol and more particularly to the hydrolysis of meta-phenylenediamine with ammonium bisulfate to produce resorcinol.

The hydrolysis of meta-phenylenediamine with dilute hydrochloric acid was reported by J. Meyer Ber. 30 Page 2568 (1897). He also discussed using sulfuric acid or stannous chloride for such hydrolysis, but obtained only low yields of resorcinol in admixture with a predominance of tarry, resinous material. My U.S. Pat. No. 3,462,497 described the hydrolysis of meta-phenylenediamine to resorcinol by use of phosphoric acid and my copending application Ser. No. 682,915 filed Nov. 14, 1967, describes the use of sulfuric acid.

Lisk U.S. Pat. No. 2,665,313 relates to the production of 1,6-naphthalenediol by heating 1-amino, 6-hydroxynaphthalene with an alkaline meta-bisulfite to form in a reaction mass an intermediate bisulfite addition product, the reaction mass is neutralized, made alkaline, heated to expel ammonia, then rendered acid with sulfuric or hydrochloric acid, and the naphthalenediol separated from the reaction mass.

SUMMARY OF THE INVENTION

In accordance with this invention, resorcinol is made by the ammonium bisulfate hydrolysis of meta-phenylenediamine by contacting the meta-phenylenediamine with at least 4 moles of ammonium bisulfate per mole of phenylenediamine in aqueous solution at a temperature of about 200°–300° C. for a time sufficient to hydrolyze the phenylenediamine to resorcinol. The aqueous solution is then cooled and the product resorcinol extracted using a suitable aliphatic or aromatic inert solvent. Hydrolysis may be repeated by reheating the reaction mixture after extraction, or the ammonium sulfate can be regenerated for reuse in the reaction by evaporating the water and heating the melt of the mixed ammonium sulfates at a temperature of 310°–450° C. Upon cooling the resulting ammonium bisulfate is dissolved in water, adjusted to the desired concentration and recycled to the reaction zone. The solvent solution from the extraction step is evaporated to give in crude product form the resorcinol that can then be distilled to provide the pure product.

DETAILED DESCRIPTION

In accordance with this invention, meta-phenylenediamine is hydrolyzed in an aqueous medium through the use of ammonium bisulfate to produce resorcinol. The byproduct salt can be regenerated to ammonium bisulfate for reuse in the process.

The composition of the hydrolysis medium is of particular importance. A minimum of 4 moles of ammonium bisulfate, based on the number of moles of phenylenediamine, is necessary in order to provide a reasonable yield of resorcinol in a single hydrolysis reaction. The hydrolysis can be carried out in one step or it can be continued sequentially by terminating the reaction, cooling, extracting the product and reheating the hydrolysis mixture without further addition of reactants. A one-step hydrolysis is desirable from the standpoint of ease and efficiency of operation, although an increase in yield can be achieved by a second hydrolysis of the reaction mixture after removing the product from the first hydrolysis. From the standpoint of obtaining high yields in a single hydrolysis step, the use of high concentrations of ammonium bisulfate up to the point of saturation of the aqueous solution is desirable. With high concentrations, a practical problem arises in the handling of large quantities of salt.

Water must be present in an amount sufficient to provide for hydrolysis and also to serve as a diluent or solvent for the phenylenediamine, ammonium bisulfate and the ammonium sulfate formed during the course of the reaction. At least 40 moles of water per mole of phenylenediamine must be present to dissolve sufficient quantities of ammonium bisulfate. As the concentration of ammonium bisulfate is increased, more water, up to about 120 moles is required. The use of excess water results in a practical problem of water removal during the ammonium bisulfate regeneration step.

The reaction temperature can vary over a wide range between about 200° to 300° C. At temperatures below about 200° C. an unduly long reaction time is required and the yields are generally low. As the temperature is increased the pressure must be correspondingly increased to maintain the reaction solution in the aqueous phase. At temperatures as high as 300° C. a steam pressure of up to about 1500 psig is required for this purpose and there is some danger of resin formation if the contact time is too long. No advantage is obtained by increasing or decreasing the pressure to a value other than that sufficient to provide for a liquid reaction medium. To avoid the use of considerable pressure, with the corresponding equipment requirements, temperatures in the range of 220°–260° C. are preferred.

The reaction time or contact time varies primarily with the temperature and to a lesser extent with the mole ratio of the reactants. At a minimum temperature, e.g., 200° C., a per pass reaction time of 8 hours is ordinarily required. At 220° C. effective results from the standpoint of yield are obtained using a two pass hydrolysis reaction and a reaction time of 3 hours per pass. Also at 220° C. good results are obtained in a single pass hydrolysis step if the reaction time is extended to 7 or 8 hours. At temperatures about 250° C., hydrolysis can occur in 5 minutes to a half hour. From a practical standpoint an overall per pass hydrolysis time can be considered to be from 5 minutes to 8 hours.

Hydrolysis is carried out in a zone which is resistant to any substantial attack by the ammonium bisulfate or phenylenediamine. At very low temperatures within the useful range an ordinary glass lined Pfaudler kettle can be used. When higher temperatures and pressurized equipment are required other construction materials become necessary. At temperatures up to 220°–230° C. Teflon lined reactors are effective. Higher temperature ranges require the use of more durable equipment, such as tantalum lined reactors.

After the period of hydrolysis, the reaction mixture is cooled to prevent resinification of the product in the acidic aqueous reaction mixture and to enable the separation of the by-product of organic solvent extraction.

Any substantially water-immiscible solvent which will dissolve the resorcinol is useful. Ether is the preferred solvent.

The organic solvent phase is then separated from the reaction mixture by decantation and the product is removed from the solvent by distillation or other means.

After removal of the resorcinol product, the resulting aqueous effluent reaction mixture can be reheated to the hydrolysis temperature for a second or even a third hydrolysis step. The second and subsequent hydrolysis steps are carried out as before by heating the reaction mixture to the appropriate temperature of hydrolysis for the desired period of time, cooling and removing the product resorcinol by solvent extraction.

Ammonium sulfate by-product is regenerated for reuse in the process by removing the residual water from the remaining reaction mixture and heating the molten salt, primarily mixed ammonium sulfate, and ammonium bisulfate at atmospheric pressure at a temperature between 310°–450° C. At temperatures below 310° C. an unduly long time is required to effect decomposition. No practical advantages are seen in using temperatures higher than 450° C. and above this temperature the bisulfate tends to decompose. At 330° C., 75–95 percent of the ammonium sulfate is converted in a few minutes to ammonium bisulfate. Slightly higher conversions are obtained at higher temperatures although this advantage is offset by the increased equipment cost required. During the decomposition of the ammonium sulfate, residual organic materials may be pyrolyzed to black granules resembling activated charcoal. This charcoal-like material is easily removed by dissolving the product in water followed by a filtration step. The ammonia formed during the decomposition can be recovered and used in other chemical processes. The clear, filtered salt solution, the salt portion of which 75–95 percent ammonium bisulfate, is adjusted to the desired concentration and is recycled to the reaction mixture for hydrolysis of additional phenylenediamine.

My invention is further illustrated by the following examples.

EXAMPLE I

A solution of meta-phenylenediamine (54 g., 0.5 moles), ammonium bisulfate (342 g., 3.0 moles) and water (540 g., 30 moles) was heated to 220° C. for 3 hours. The amber colored reaction mixture was cooled and was shaken with ether (2 × 250 ml). The aqueous solution after boiling to remove dissolved ether was heated again for 3 more hours at 220° C. The reaction mixture was cooled and was extracted with ether (2 × 250 ml). The ether solutions were stripped to dryness on a steam bath and the crude resorcinol distilled at 140° C./6mm. The first ether extract gave 38.1 g (69%) of resorcinol and the second ether extract gave 11.1 g. (20%) of resorcinol for a total yield of 89%. The non-distillable residue was (4.8%).

EXAMPLE II

A solution of meta-phenylenediamine (54 g., 0.5 mole), ammonium bisulfate (285 g., 2.5 moles) and water (540 g. 30 moles) was heated to 220° C. for 3 hours. The reaction mass was cooled. After extracting with ether (2 × 250 ml) the effluent was cycled for a second time under the same conditions as before. The first ether extract gave 31.9 g. (58%) of resorcinol and the second ether extract gave 13.2 g. (24%) of resorcinol for a total yield of 82%. The non-distillable residue was 5.3%.

EXAMPLE III

The effluent from the process of Example I was decomposed to provide bisulfate for recycling. The inorganic sulfates present after evaporating the effluent to a dry salt weighted 68 g. An aliquot of the salt was titrated with 1/10 N NaOH in the presence of brom cresol blue indicator and was found to be 52.3% bisulfate (47.7% ammonium sulfate by difference). This mixed, dry salt was heated in an oil bath and could be stirred easily after reaching 146° C. which is the melting point of ammonium bisulfate. At 298° C. for 2 min., the salt weighed 66 g. and was 70% ammonium bisulfate by titration. Heating was continued until a temperature of 312° C. was reached and the melt was held at 312° C. for 12 minutes, at which time the ammonium bisulfate content was 95%; the salt weighed 64.6 g. (theoretical weight loss). The loss in weight of the salt on heating was due to ammonia evolution. The organic material in the effluent was converted to fine carbonaceous particles during the heating of the melt. The thermally treated salt mixture was taken up in water and the black mixture filtered. After filtering, the ammonium bisulfate solution was clear. Evaporation of the filtrate gave light yellow ammonium bisulfate crystals.

EXAMPLE IV

Recycle ammonium bisulfate (131 g., 0.98 mole) 92% pure and prepared as described in Example III, meta-phenylenediamine (17.6 g. 0.163 mole), and water, 176 g. (9.8 moles) were heated in a glass liner placed in an autoclave at 220° C. for 7 hours. The reaction mass was cooled and the resorcinol product was extracted with ether (2 × 75 ml). The extract was distilled to leave 18.0 g. of crude resorcinol. The crude product was flash-distilled at 140° C./7 mm. to give 14.6 g. (83% yield) of resorcinol. The effluent was evaporated to dryness and gave 134 g. of salt which analyzed as 60.5% ammonium bisulfate (39.5% ammonium sulfate by difference).

What is claimed is:

1. A method of making resorcinol comprising:
   a. contacting m-phenylenediamine with ammonium bisulfate in an aqueous solution that contains 4 to 12 moles of ammonium bisulfate per mole of m-phenylenediamine and 40–120 moles of water per mole of m-phenylenediamine and that is at a temperature of 200°–300° C. for a period of ½ to 8 hours to hydrolyze said m-phenylenediamine to resorcinol,
   b. cooling said hydrolysis reaction mixture, and
   c. extracting said resorcinol from said solution with a water-immiscible organic solvent.

2. The method of claim 1 wherein the solution from which the resorcinol has been extracted is maintained at a temperature of 200°–260° C. for an additional period of time to hydrolyze residual m-phenylenediamine to resorcinol.

3. A method of making resorcinol comprising:
   a. contacting m-phenylenediamine with ammonium bisulfate in an aqueous solution that contains 4–12 moles of ammonium bisulfate per mole of m-phenylenediamine and 40–120 moles of water per mole of m-phenylenediamine and that is at a temperature of 200°–260° C. for a period of ½ to 8 hours to hydrolyze said m-phenylenediamine to resorcinol, b. cooling said hydrolysis reaction mixture, c. extracting said resorcinol from said solution with an inert water-immiscible organic solvent, thereafter d. evaporating the water from said solution to obtain a residue consisting essentially of ammonium sulfate and ammonium bisulfate, and e. heating said residue to an elevated temperature of 310°–450° C. to convert said ammonium sulfate to ammonium bisulfate for reuse to hydrolyze more m-phenylenediamine to resorcinol.

* * * * *